3,517,023
DERIVATIVES OF α-AMINOBENZYLPENICILLIN
Leonard Bruce Crast, Jr., North Syracuse, N.Y., assignor to Bristol-Myers Company, New York, N.Y., a corporation of Delaware
No Drawing. Filed Sept. 5, 1967, Ser. No. 671,911
The portion of the term of the patent subsequent to Jan. 13, 1987, has been disclaimed
Int. Cl. C07d 99/14, 99/16
U.S. Cl. 260—306.7     4 Claims

ABSTRACT OF THE DISCLOSURE

6 - [D-(—)α-amino-α-(3,5-dichloro-4-hydroxyphenyl)-acetamido] penicillanic acid and 6-[D-(—)-2,2-dimethyl-4-(3,5 - dichloro - 4 - hydroxyphenyl) - 5 - oxo-1-imidazolidinyl] penicillanic acid and the salts thereof are new synthetic compounds of value as antibacterial agents and in the treatment of bacterial infections.

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in the treatment of infectious diseases caused by Gram-positive and Gram-negative bacteria.

Description of the prior art

There exists a need to provide alternative and improved agents for the treatment of infections caused by Gram-positive and Gram-negative bacteria, or for the decontamination of objects bearing such organisms, e.g. hospital equipment, walls of operating rooms and the like. Of particular need are antibacterial agents which exhibit good oral absorption in animals.

SUMMARY OF THE INVENTION

The compounds of this invention are 6-[D-(—)-α-amino-α-(3,5-dichloro-4-hydroxyphenyl)-acetamido] penicillanic acid having the formula
(I)

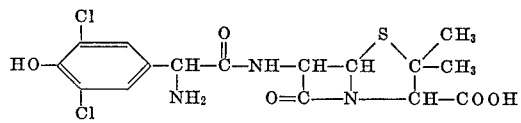

and 6-[D-(—)-2,2-dimethyl-4-(3,5-dichloro - 4 - hydroxyphenyl) 5-oxo-1-imidazolidinyl] penicillanic acid having the formula
(II)

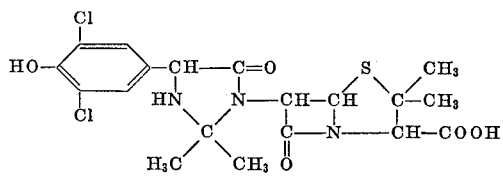

and the nontoxic pharmaceutically acceptable salts thereof.

The nontoxic, pharmaceutically acceptable salts include, for example, (1) nontoxic pharmaceutically acceptable salts of the acidic carboxylic acid group such as the sodium, potassium, calcium, aluminum and ammonium salts and nontoxic substituted ammonium salts with amines such as tri (lower) alkylamines, procaine, dibenzylamine, N-benzyl-beta - phenethylamine, 1 - ephenamine, N,N'-dibenzylethylenediamine, dehydroabiethylamine, N, N'-bis-dehydroabiethylethylenediamine, N - (lower)alkyl-piperidines, such as N-ethylpiperidine and other amines which have been used to form salts of benzylpenicillin; and (2) nontoxic pharmaceutically acceptable acid addition salts (i.e. salts of the basic nitrogen) such as (a) the mineral acid addition such as the hydrochloride, hydrobromide, hydroiodide, sulfate, sulfamate, sulfonate, phosphate, etc. and (b) the organic acid addition salts such as the maleate, acetate, citrate, tartrate, oxalate, succinate, benzoate, fumarate, malate, mandelate, ascorbate, β-naphthalene sulfonate, p-toluenesulfonate and the like. Also included are the easily hydrolized esters or amides of such acids which may be converted to the free acid form by chemical or enzymatic hydrolysis.

The compounds of Formula I of the present invention are prepared in the form in which the α-amino group is blocked by the reaction of 6-aminopenicillanic acid (preferably in the form of a neutral salt such as the sodium salt or the triethylamine salt) with a mixed anhydride e.g. mixed anhydride obtained from reaction with ethyl chlorocarbonate, of an acid having the formula

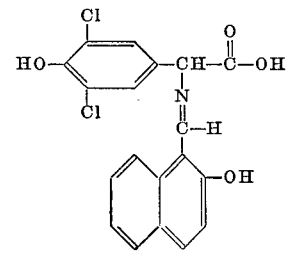

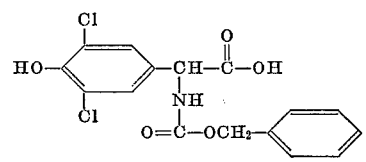

or the formula

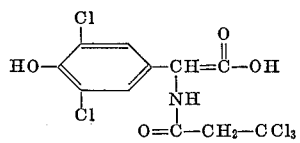

or with its functional equivalent as an acylating agent for a primary amino group. Such mixed anhydrides include particularly the mixed anhydrides prepared from stronger acids such as the lower aliphatic monoesters of carbonic acid, of alkyl and aryl sulfonic acids and of more hindered acids such as diphenylacetic acid. Such equivalents include the corresponding carboxylic chlorides, bromides, and then acid anhydrides. In addition, an acid azide or an active ester or thioester (e.g. with p-nitro-phenyl, 2,4-nitrophenol, triophenol, thioacetic acid) may be used or the free acid itself may be coupled with 6-aminopenicillanic acid after first reacting said free acid with N,N'-dimethylchloro-forminium chloride [cf. Great Britain 1,008,170 and Novak and Weichet, Experientia XXI/6, 360 (1965)] or by the use of enzymes or of an N,N'-carbonylimidazole or an N,N'-carbonylditriazole [cf. South African patent specification 63/2,684 of a carbodiimide reagent [especially N,N'-dicyclohexylcarbodiimide, N,N'-diisopropylcarbodiimide or N-cyclohexyl-N'-(2-morpholinoethyl) carbodiimide; cf. Sheehan and Hess, J. Amer. Chem. Soc. 77, 1067, (1955)], or of alkynylamine reagent [cf. R. Buijle and H. G. Viehe, Angew, Chem. International Edition 3, 582 (1964)], or of a ketenimine reagent [cf. C. L. Stevens and M. E. Monk, J. Amer. Chem. Soc. 80, 4065 (1958)] or of an isooxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e. an amide of the corresponding acid whose amide nitrogen is a member of a quasiaromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carobn dioxide and one mole of imidazole. Dicarboxylic acids yield diimidazolides. The by-product, imidazole, precipitates and may be separated and the imidazole isolated, but this is not essential. The methods for carrying out these reactions to produce a penicillin and the methods used to isolate the penicillins so produced are well known in the art.

The blocking group is then removed to form the products of the present invention, e.g. the 2-hydroxy-1-naphthcarbonyl groups is removed by acid hydrolysis, the carbobenzyloxy group is removed by catalytic hydrogenation and the trichloroethoxycarbonyl group by treatment with zinc dust in glacial acetic acid. Obviously other functionally equivalent blocking groups for an amino group can be used and such groups are considered within the scope of this invention.

The compounds of Formula II of the present invention are prepared by reaction of acetone with the corresponding penicillin of Formula I.

Although some reaction will occur no matter what molar proportion of reactants is used, it is preferable in order to obtain maximum yields to use a molar excess of the acetone and the latter may well be used as the reaction solvent. Water is split off during the reaction and it is thus preferable not to have a major amount of water in the reaction medium. The pH of the reaction mixture should be from 5 to 9 and preferably on the alkaline side. The pH may be adjusted to within this range, if necessary, by the addition of an alkaline material such as, for example, sodium hydroxide, sodium carbonate, potassium hydroxide, potassium carbonate, ammonium hydroxide, ammonium carbonate, organic amines (e.g. triethylamine), etc.

The temperature during the reaction is not critical. The reaction will proceed satisfactorily at room temperature and may be hastened by heating.

Thus the present invention includes the process of preparing the compound of the formula

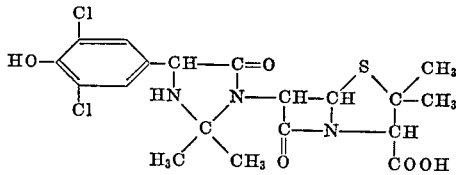

which comprises mixing a penicillin of Formula I with at least an equimolar weight of acetone in the absence of substantial amounts of water at pH in the range of 5 to 9 and at a temperature in the range of −20° C. to +50° C.

D-(−)-2-(p-hydroxyphenyl)-glycine used as a starting material for the preparation of the compounds of this invention is prepared according to the reaction scheme exemplified below.

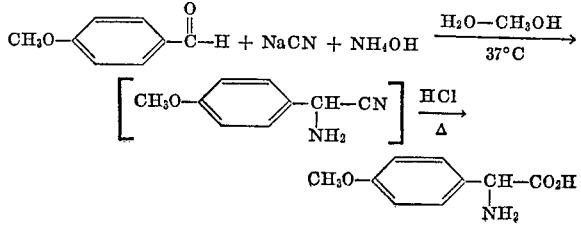

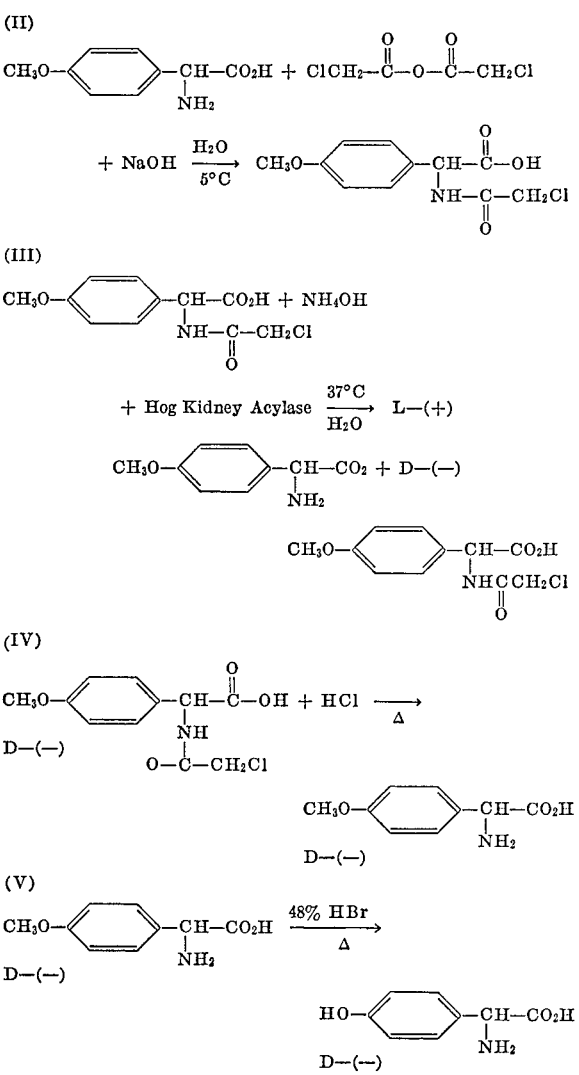

(I) dl-2-(p-methoxyphenyl)-glycine

To a stirred solution of 19.6 g. (0.4 mole) of NaCN in 80 ml. of $H_2O$ was added 23.6 g. (0.450 mole) of $NH_4Cl$ and 20 ml. of conc. $NH_4OH$ followed by 54.5 g. (0.4 mole) of anisaldehyde in 160 ml. of methanol and the temperature maintained at 37° C. for two hours. The methanol was then removed in vacuo and the remaining mixture extracted with two 150 ml. portions of methyl isobutyl ketone (MIBK) and combined. The combined MIBK extracts were washed once with 30 ml. of $H_2O$ and then 240 ml. of 6NHCl added with good mixing and the MIBK was removed in vacuo. The resulting slurry was heated at reflux (now in solution) for two hours. One hundred ml. of $H_2O$ was added to the hot solution and then 8 g. of decolorizing carbon added and after ten minutes at gentle reflux the carbon was filtered off and washed with 50 ml. of hot water. The combined filtrates (hot) were stirred and treated with conc. $NH_4OH$ until pH 5–6 was obtained (pH paper). The slurry was then cooled to 5° C. and after one hour the crystals were filtered off and washed with two 100 ml. portions of water. The damp cake was then slurried in 250 ml. of water and 50% NaOH added slowly until the product dissolved. Two 300 ml. ether extracts were then taken and discarded. The pH was then adjusted to 5.5 with 6NHCl with cooling. After one hour the product was filtered off, washed with 3× 100 ml. $H_2O$ and air dried. Yield 40 g.; dec. 244° C. with sublimation at 230° C.

(II) dl-2-(p-methoxyphenyl)-N-(chloro acetyl) glycine

To a stirred suspension of 36 g. (0.2 mole) of dl-2-(p- methoxyphenyl)-glycine in 500 ml. of $H_2O$ was added 8 g. (0.2 mole of NaOH pellets and when a clear solution was obtained the solution was cooled to 5° C. and with vigorous stirring 68.2 g. (0.4 mole) of chloroacetic anhydride (warm) was added all at once. Then a solution of 16 g. (0.4 mole) of NaOH in 100 ml. of $H_2O$ was added over a 10 to 15 minute period. More 20% NaOH was added as needed to keep the pH at about 9 for a 1.5 hour period. Next, the pH was adjusted to 2 with 40% $H_3PO_4$. The product crystallized immediately and was filtered off, washed with water and recrystallized from ethanol-water to give 38 g. of product melting at 182°–183° C.

Analysis.—Calcd. for $C_{11}H_{12}ClNO_4$ (percent): C, 51.21; H, 4.69. Found (percent) C, 51.49; H, 4.90.

(III) D-(—)-2-(p-methoxyphenyl)-N-chloroacetylglycine and L-(+)-2-(p-methoxyphenyl)-glycine To 800 ml. of $H_2O$ stirred at 37° C. was added 38 g. (0.148 mole) of dl-2-(p-methoxyphenyl)-N'chloro-acetylglycine and $NH_4OH$ added dropwise until pH 7.8 was obtained. To the resulting solution was added 2 g. of Hog Kidney Acylase (Sigma Chemical Company) and stirring continued at 37° C. (internal) for 21 hours. The solids containing crude L-(+)-2-(p-methoxyphenyl)-glycine were then filtered off and washed with 2× 100 ml. $H_2O$ and the pH of the combined filtrates adjusted to 4–5 with glacial acetic acid. This solution was heated on the steam bath for 30 min. with 5 g. of decolorizing carbon and then filtered. The carbon cake was washed with 50 ml. of warm water and the combined filtrates cooled and acidified to pH 2 with 40% $H_3PO_4$. After one hour cooling at 0° C. the crystalline product was filtered off and washed with cold water (3×) and air dried. The yield was 16 g. D-(—)-2-(p-methoxyphenyl)-N-chloroacetylglycine and when a second run using 5× the above amounts were used a yield of 83 g. (87% yield) was obtained. M.P. 170°–171° C.; $[\alpha]_D^{25°\ C.}$ —193° (C=1%, ethanol)

Analysis.—Calcd. for $C_{11}H_{12}ClNO_4$ (percent): C, 51.21; H, 4.69. Found (percent): C, 51.50; H, 4.99.

When the solids containing crude L-(+)-2-(p-methoxyphenyl)-N-chloroacetylglycine are treated with hot 3NHCl (200 ml.) and carbon followed by filtration and pH adjustment to 5.5 there is obtained 6 g. (first run) of pure L-(+)-2-(p-methoxyphenyl)glycine. $[\alpha]_D^{25°\ C.}$ +150.4° (c.=1%, 1NHCl).

(IV) D-(—)-2-(p-methoxyphenyl)-glycine

The 16 g. of D-(—)-2-(p-methoxyphenyl)-N-(chloroacetyl) glycine was refluxed 1.5 hours in 170 ml. of 2NHCl. The resulting clear solution was filtered and cooled at 5° C. and the pH adjusted to 5.5 with $NH_4OH$. The product was then filtered off after cooling 30 min. and washed with 3× 25 ml. of cold water. The dried material D-(—)-2-(p-methoxyphenyl)-glycine weighd 9.5 g. A second run gave 54 g. using the 83 g. of starting material from III. $[\alpha]_D^{25°\ C.}$ —149.9° (c.=1%, 1NHCl) (first run). $[\alpha]_D^{25°\ C.}$ —148.1° (c.=1%, 1NHCl) (second run).

Analysis.—Calcd. for $C_9H_{11}NO_3$ (percent): C, 59.67; H, 6.13; N, 7.7. Found (percent): C, 59.38; H, 6.16; N, 8.00.

(V) D-(—)-2-(p-hydroxyphenyl)-glycine

A mixture of 1.81 g. (0.01 mole) of D-(—)-2-(p-methoxyphenyl)glycine. $[\alpha]_D^{25°\ C.}$ —149.9° (c.=1%, 1NHCl) and 10 ml. of 48% HBr was heated at gentle reflux for 2 hours. The resulting solution was concentrated at reduced pressure at 30° C. to a wet solid. A minimum amount of water (20° C.) was added to dissolve the HBr salt and with cooling $NH_4OH$ was added to pH 5. The resulting thick gel which ppt. was warmed to 50° C. and when solution was nearly obtained a different crystalline form began to ppt. Upon cooling 30 min. at 0°–5° C. there was obtained 990 mg. of cold water washed (3× 1 ml.) and air dried material, D-(—)-2-(p-hydroxyphenyl glycine. $[\alpha]_D^{25°\ C.}$ —161.2° (c.=1%, 1NHCl) dec. pt. 223° C.

A second run using 20× the above amounts gave 24.5 g. of material. $[\alpha]_D^{25°\ C.}$ —153° (c.=1%, 1NHCl).

Analysis.—Calcd. for $C_8H_9NO_3$ (percent): C, 57.49; H, 5.43; N, 8.39. Found (percent): C, 57.41; H, 5.67; N, 8.39.

The compounds of the present invention are useful in the treatment of infections caused by Gram-positive bacteria, including particularly the resistant strains of bacteria and Gram-negative bacteria, e.g. penicillin-resistant strains of Staphylococcus aureus (Mirrococcus pyrogenes var. aureus). In addition, the compounds of the present invention are orally absorbed.

In the treatment of bacterial infections in man, the compounds of this invention are administered orally or parenterally, in accordance with conventional procedures for antibiotic administration, in an amount of from about 5 to 60 mg./kg./day and preferaby about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto.

EXAMPLES (1) D-(—)-2-(3,5-dichloro-4-hydroxyphenyl)-glycine

To a stirred suspension of 5.01 g. (0.03 mole) of D-(—)-2-(4-hydroxyphenyl) glycine in 100 ml. of glacial acetic acid was bubbled in HCl gas at a vigorous rate for about 5 minutes. At first a clear solution resulted and then the hydrochloride salt crystallized out. Next, 9.0 g. (0.067 mole) of sulfuryl chloride (freshly distilled) in 25 ml. of glacial acetic acid was added, with stirring, over a 30 minute period, dropwise. The temperature was 26°–27° C. throughout the addition. After the sulfuryl chloride addition, the slurry was heated to 70° C. for 30 minutes and then stirred at ambient temperature for two hours. Then 250 ml. of dry ether was added slowly and crystallization began. After 15 min. the product was filtered off, washed with dry ether and air dried. The 7 g. obtained was dissolved in 100 ml. of 1NHCl, filtered, and the pH adjusted, with cooling to 5 with conc. $NH_4OH$. The resulting crystalline product was filtered off after 5 min. standing, washed with two 20 ml. portions of water and 5× with acetone. The vacuum dried material weighed 4.5 g.; dec. pt. 210° C. (sharp). The NMR and IR spectra were consistent with the desired structure. $[\alpha]_D^{22°\ C.}$ —126.3° (c. (percent)=1%, 1NHCl).

Analysis.—Calcd. for $C_8H_7Cl_2NO_3$ (percent): C, 40.78; H, 2.99; Cl, 30.04. Found (percent): C, 41.85; H, 3.22; Cl, 27.80.

(2) Sodium D-(—)-N-(2-hydroxy-1-naphthylmethylene)-2-amino-2(3,5-dichloro-4-hydroxyphenyl-acetate To a stirred solution of (0.04 mole) of D-(—)-2-(3,5-dichloro-4-hydroxyphenyl)-glycine 25 ml. $H_2O$, 10 ml. ethanol, and 1.6 g. (0.04 mole) of sodium hydroxide is added, all at once, a warm solution of 7.57 g. (0.044) mole of 2-hydroxy-1-naphthaldehyde (Aldrich Chemical Company) in 40 ml. of 95% ethanol. The mixture is heated until an initial precipitate redissolves and then is rapidly cooled to about 5° C. and scratched. After cooling one hour in the ice bath the crystalline product is filtered off and air dried. The infrared and NMR spectra are entirely consistent with the desired structure.

6-[D-(—) - 2,2 - dimethyl - 4-(3,5-dichloro-4-hydroxyphenyl) - 5 - oxo - 1 - imidazolidinyl]penicillanic acid To a stirred and cooled (—10° C.) suspension of (0.01 mole) of sodium D-(—)-N-(2-hydroxy-1-napthalmethylene)-α-amino-α - (3,5 - dichloro-4-hydroxyphenyl) acetate in 100 ml. of acetone, 5 ml. of p-dioxane and 3 drops of pyridine is added 1.08 g. (0.01 mole) of ethyl chloroformate (EKC). The mixture is stirred at —10° C. for 30 minutes and then cooled to —40° C. and filtered to remove the sodium chloride which precipitated. To this filtrate of the mixed anhydride, vigorously stirred at —15° C. is added, all at once, a precooled (0° C.) solution of 2.16 g. (0.01 mole) of 6-aminopenicillanic acid, 1.68 g. (0.02 mole) of $NaHCO_3$ in 50 ml. of water. There is vigorous $CO_2$ evolution for about 5 minutes. The temperature is kept at or below —10° C. for 20 minutes and then allowed to come to room temperature (22° C.) for over a 30 minute period. To this solution is added 50 ml. of water and the acetone removed under pressure at 20° C. Two ml. ether extracts are taken and discarded. The aqueous layer is then adjusted to pH 2 with 6NHCl with sufficient acetone added to keep everything in solution. This solution is allowed to stand 30 minutes at 22° C. and then two 300 ml. ether extracts are taken and discarded. The pH is readjusted to 4.7 with 20% NaOH and concentrated under reduced pressure to a volume of 25 ml. at 20° C. A small amount of insoluble material is filtered off and 25 ml. acetone added to the filtrate. The pH is then adjusted to 8.8 with 20% NaOH and the resulting solution let stand at 10° C. for 5 hours. The pH is adjusted to 3 with 40% $H_3PO_4$ and two 100 ml. ethyl acetate extracts taken. The combined ethyl acetate extracts are washed once with 20 ml. $H_2O$ and then filtered and concentrated under reduced pressure at 15° C. to a volume of about 20 ml. The crystalline product is filtered off and slurried in 10 ml. of acetone-water (1:1 by volume) for 10 minutes and filtered again. The product obtained D-(—)-6-[2,2-dimethyl-4-(3,5 - dichloro-4-hydroxyphenyl) 5-oxo-1 - imidazolidinyl]penicillanic acid and having IR and NMR spectra entirely consistent with the proposed structure.

This compound is found to inhibit *Staphylococcus aureus* Smith at concentrations of 0.001 percent by weight.

(4) 6-[D-(—)-α-amino-α-(3,5-dichloro-4-hydroxyphenyl) acetamido]-penicillanic acid To a stirred suspension of 600 mg. of 6-[D-(—)-2,2-dimethyl-4(3,5-dichloro - 4 - hydroxyphenyl) - 5-oxo-1-imidazolidinyl]penicillanic acid in 5 ml. of water is added 20% sodium hydroxide solution until pH 7 is obtained. The pH is maintained at about 7 with occasional addition of 1NHCl for four hours and then the pH is adjusted to 4.5 with 1NHCl and maintained at pH 4.5 for another hour. The crystalline precipitate that forms is separated by filtration, washed with water and dried in vacuo over $P_2O_5$, yielding the product 6-[D-(—)-α-amino-α-(3,5-dichloro - 4 - hydroxyphenyl)-acetamido]-penicillanic acid. The infrared spectrum is consistent with the proposed structure having a peak at 1600 cm.$^{-1}$.

This compound is found to inhibit *Staphylococcus aureus* Smith at concentrations of 0.001 percent by weight.

I claim:

1. A compound selected from the group consisting of 6-[D-(—)-2,2 - dimethyl - 4 - (3,5-dichloro-4-hydroxyphenyl)-5-oxo-1-imidazolidinyl] penicillanic acid and the non-toxic pharmaceutically acceptable salts thereof.
2. The sodium salt of the compound of claim 1.
3. The potassium salt of the compound of claim 1.
4. The triethylamine salt of the compound of claim 1.

References Cited

UNITED STATES PATENTS

| 3,071,575 | 1/1963 | Doyle et al. | 260—239.1 |
| 3,256,272 | 6/1966 | Ito et al. | 260—239.1 |
| 2,985,648 | 5/1961 | Doyle et al. | 260—239.1 |

FOREIGN PATENTS

| 978,178 | 12/1964 | Great Britain. |

NICHOLAS S. RIZZO, Primary Examiner

U.S. Cl. X.R.

260—239.1, 999